United States Patent
Mateo Artieda et al.

(10) Patent No.: US 9,889,844 B2
(45) Date of Patent: Feb. 13, 2018

(54) FLYING CAR EXTENDED VEHICLE CONTROL METHOD

(71) Applicant: Robert Bosch GmbH, Stuttgart (DE)

(72) Inventors: Jesus M. Mateo Artieda, Kornwestheim (DE); Vaughan Scott, Royal Oak, MI (US); Celeste M. Cauley, Ann Arbor, MI (US); Mandeep Singh Sangha, Westland, MI (US)

(73) Assignee: Robert Bosch GmbH, Stuttgart (DE)

( * ) Notice: Subject to any disclaimer, the term of this patent is extended or adjusted under 35 U.S.C. 154(b) by 198 days.

(21) Appl. No.: 14/748,735

(22) Filed: Jun. 24, 2015

(65) Prior Publication Data
US 2016/0375896 A1  Dec. 29, 2016

(51) Int. Cl.
*G06F 7/00* (2006.01)
*B60W 30/02* (2012.01)
(Continued)

(52) U.S. Cl.
CPC .............. *B60W 30/02* (2013.01); *B60T 7/12* (2013.01); *B60T 8/172* (2013.01); *B60T 8/175* (2013.01); *B60T 8/1755* (2013.01); *B60T 8/17616* (2013.01); *B60T 13/66* (2013.01); *B60T 13/662* (2013.01); *B60W 10/04* (2013.01);
(Continued)

(58) Field of Classification Search
CPC ................................. B60W 30/02; B60T 7/12
See application file for complete search history.

(56) References Cited

U.S. PATENT DOCUMENTS 6,494,281 B1 * 12/2002 Faye ..................... B60K 31/00
                                                        180/197
7,006,901 B2   2/2006 Wang
(Continued)

FOREIGN PATENT DOCUMENTS

DE    102006033257    2/2007
DE    102006050875    5/2007
(Continued)

OTHER PUBLICATIONS

Extended European Search Report for Application 16172101.4 dated Oct. 24, 2016 (8 pages).
(Continued)

*Primary Examiner* — Adam Alharbi
(74) *Attorney, Agent, or Firm* — Michael Best & Friedrich LLP

(57) ABSTRACT

Systems and methods to adjust the operation of various vehicle control systems to improve performance based on detection of a condition in which the vehicle is in an unloaded or reduced normal force state. In one embodiment, the system includes a vehicle control system, a sensor module, and a controller. The controller is configured to receive sensor values from the sensor module. The controller is further configured to determine vehicle motion characteristics based on the sensor values. The controller is further configured to determine that an unloaded state exists when the values of the vehicle motion characteristics exceed threshold values. The controller is further configured to activate countermeasures when the controller determines that the unloaded state exists.

18 Claims, 3 Drawing Sheets

(51) Int. Cl.
  *B60T 7/12* (2006.01)
  *B60T 8/172* (2006.01)
  *B60T 8/175* (2006.01)
  *B60T 13/66* (2006.01)
  *B60W 10/04* (2006.01)
  *B60W 10/18* (2012.01)
  *B60W 10/20* (2006.01)
  *B60T 8/1755* (2006.01)
  *B60T 8/1761* (2006.01)
  *B60T 8/58* (2006.01)

(52) U.S. Cl.
  CPC ............ *B60W 10/18* (2013.01); *B60W 10/20* (2013.01); *B60T 8/58* (2013.01); *B60T 2240/06* (2013.01); *B60W 2520/00* (2013.01); *B60W 2710/0677* (2013.01); *B60W 2710/18* (2013.01); *B60W 2710/20* (2013.01)

(56) References Cited

U.S. PATENT DOCUMENTS

| | | |
|---|---|---|
| 7,292,924 B2 | 11/2007 | Milot |
| 8,175,785 B2 | 5/2012 | Turski et al. |
| 8,433,494 B2 | 4/2013 | Vogel |
| 8,740,744 B2 | 1/2014 | Grutter et al. |
| 8,649,948 B2 | 2/2014 | Yanagida et al. |
| 8,825,267 B2 | 9/2014 | Gerdin et al. |
| 8,843,233 B2 | 9/2014 | Dollens |
| 2005/0033486 A1 | 2/2005 | Schmitt et al. |
| 2006/0261937 A1 | 11/2006 | Lu et al. |
| 2006/0267750 A1 | 11/2006 | Lu et al. |
| 2008/0033695 A1* | 2/2008 | Sahara ............... G01H 1/003 702/185 |
| 2009/0152940 A1 | 6/2009 | Mercier et al. |
| 2016/0146334 A1* | 5/2016 | Nelson ............... F16H 61/0204 701/22 |

FOREIGN PATENT DOCUMENTS

| | | |
|---|---|---|
| DE | 102009019960 | 12/2009 |
| DE | 102011004028 | 8/2012 |

OTHER PUBLICATIONS

Talukder et al., "Autonomous Terrain Characterisation and Modelling for Dynamic Control of Unmanned Vehicles" University of California at Santa Cruz, published in Proceedings 2002 IEEE/RSJ International Conference on Intelligent Robots and Systems, Oct. 2002 (6 pages).

Chevrolet, ""Flying Car": Performance Traction Management—2014 Camaro Z/28 | Chevrolet," Published on YouTube Feb. 25, 2014 (https://www.youtube.com/watch?v=Rgv5ihrHA-I).

TouriClips, "2016 Cadillac ATS-V spied testing at the Nürburgring!," Published Jul. 26, 2014 (https://wwwyoutube.com/watch?v=901zz7T8p4s).

TouriClips, "2016 Cadillac CTS-V spied testing on the Nürburgring!," Published Jul. 29, 2014 (https://www.youtube.com/watch?v=CecjymI6vWg).

Ballaban, "The 2016 Cadillac ATS-V Will Literally Fly Around the Track," Jalopnik, Jul. 28, 2014 (http://jalopnik.com/the-2016-cadillac-ats-v-will-literally-fly-around-the-t-1612288158).

* cited by examiner

FLYING CAR EXTENDED VEHICLE CONTROL METHOD

BACKGROUND

Embodiments of the present invention relate to the field of vehicle control systems.

SUMMARY

In one embodiment, the invention provides a system for detecting and correcting for an unloaded vehicle condition. The system includes a vehicle control system, a sensor module, and a controller. The controller is configured to receive sensor values from the sensor module. The controller is further configured to determine vehicle motion characteristics based on the sensor values. The controller is further configured to determine that an unloaded state exists when the values of the vehicle motion characteristics exceed threshold values. The controller is further configured to activate countermeasures when the controller determines that the unloaded state exists.

In some embodiments, the controller is further configured to deactivate the countermeasures when the value of the vehicle motion characteristics return to values at or below the threshold. In some embodiments, the controller is further configured to deactivate the countermeasures when a timer expires. In some embodiments, the controller is further configured to deactivate the countermeasures when an unstable condition is detected.

In some embodiments, the threshold is determined based on system variables, including, for example, a vehicle mode status, a steering angle, a throttle position, a brake pedal indicator, a vehicle speed, and a coefficient of friction.

In some embodiments, the sensor values include, for example, a left front displacement, a right front displacement, a left rear displacement, a right rear displacement, a normal force, and an inertia.

In some embodiments, the vehicle motion characteristics include, for example, vehicle pitch, vehicle roll, vehicle heave, front axle displacement, front axle roll, rear axle displacement, and rear axle roll.

In some embodiments, the countermeasures include, for example, adjusting the control sensitivity of the vehicle control system, adjusting the magnitude of an intervention of the vehicle control system, adjusting the entry point of the vehicle control system, and adjusting the exit point of the vehicle control system.

In another embodiment the invention provides a method for detecting and correcting for an unloaded vehicle condition. The method includes using a controller to receive sensor values from a sensor module. The method further includes the controller determining vehicle motion characteristics based on the sensor values. The method further includes the controller determining that an unloaded state exists when the values of the vehicle motion characteristics exceeds threshold values. The method further includes the controller activating countermeasures when the controller determines that the unloaded state exists.

Other aspects of the invention will become apparent by consideration of the detailed description and accompanying drawings.

DETAILED DESCRIPTION

Figure 1:
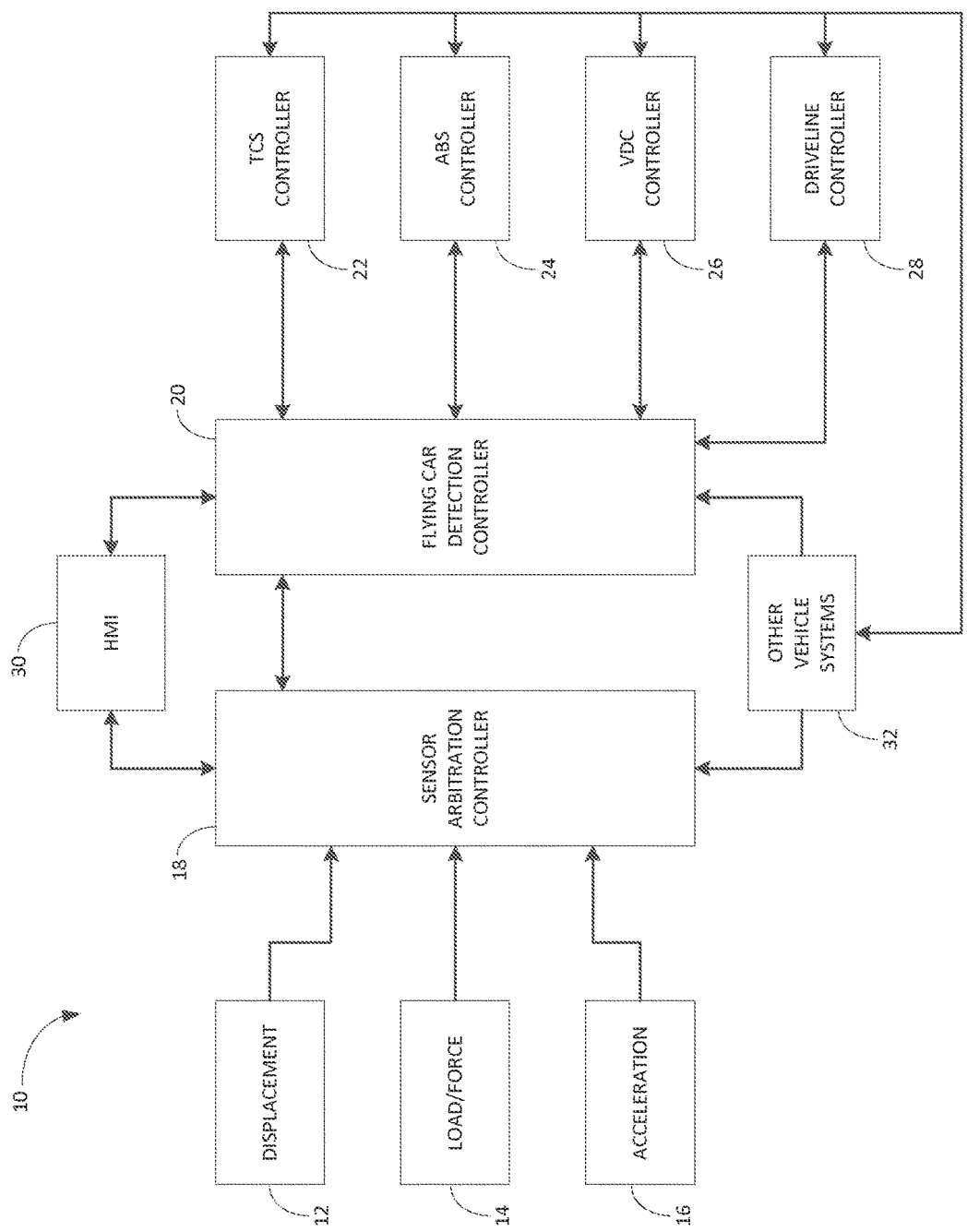
FIG. 1 is a block diagram of a control system for a vehicle in accordance with some embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

During ordinary operation of a vehicle, i.e., travelling smoothly over an even road surface, the various vehicle components and systems experience expected downward forces. However, some driving conditions (e.g., cresting a hill, passing over a surface elevation drop-off, driving over curbing, and the like) may cause the vehicle to move upward. This upward movement causes the vehicle, or portions thereof, to experience unexpected reduced downward forces and enter an unloaded state, referred to herein as the flying car state.

The force changes on the vehicle while it is in the flying car state affect vehicle dynamics and standard vehicle control algorithms may suffer reduced performance. For example, an antilock braking system control algorithm may assume a typical normal force value for the wheels when it determines how and when to apply braking forces. As used herein, "normal force" is the component of the vehicle's downward force that is perpendicular to the road surface. A "typical" normal force value is a value, or range of values for the normal force that can be expected under normal operating conditions. For example, when the vehicle is static, the normal force value is the weight of the vehicle. If the vehicle is experiencing flying car state, the algorithms may not allow enough braking force to be applied by the driver. Accordingly, some of the systems and methods discussed below detect and characterize the flying car state and activate countermeasures to adjust the operation of various vehicle control systems to improve performance once the flying car state is detected.

FIG. 1 schematically illustrates an exemplary system 10 for a vehicle (not shown). The system 10 includes a displacement sensor module 12, a force sensor module 14, and an acceleration sensor module 16. Alternative embodiments may include more than one sensor module of each type. The system 10 also includes a sensor arbitration controller 18, a flying car detection controller 20, a traction control system (TCS) controller 22, an anti-lock brake system (ABS) controller 24, a vehicle dynamics control (VDC) controller 26, and a driveline controller 28, each of which controls a different vehicle control system (not shown). The vehicle control systems, which are described below in more detail, are capable of sensing undesirable driving conditions and automatically controlling various vehicle systems (e.g., braking, steering, and engine power output) to prevent or recover from undesirable driving conditions (e.g., brake lock up, wheel slip, loss of control, and the like). The system 10 also includes a human machine interface 30. In some embodiments, the components are electrically connected to each other and to other vehicle systems 32 as illustrated in FIG. 1. The connections could be a data bus, or a wired, wireless, or optical connection that enables the components of the system 10 and other vehicle systems 32 to communicate using network communications protocols, for example, the CAN protocol. As described more particularly below, the components of the system 10 are configurable to detect the flying car state (an unloaded condition), characterize the flying car state (determine the nature and degree of the unloaded condition), and activate countermeasures to improve performance in the vehicle control systems once the flying car state is detected.

The displacement sensor module 12, force sensor module 14, and acceleration sensor module 16 each include a controller and one or more sensors. The sensors are configurable to determine various attributes of the vehicle. These attributes include, for example, the position of the vehicle or portions or components of the vehicle, the movement of the vehicle or portions or components of the vehicle, and the forces acting on the vehicle or portions or components of the vehicle. In each sensor module, the sensors are electrically connected to the module's processor and are configured to communicate the sensor readings to the module's processor. The processors are configurable to receive and interpret the sensor readings to determine values for various vehicle attributes, including, for example, ride height displacement, downward force, and inertia. The displacement sensor module 12, force sensor module 14, and acceleration sensor module 16 are configurable to provide the values to the sensor arbitration controller 18. In alternative embodiments, the displacement sensor module 12, force sensor module 14, and acceleration sensor module 16, or combinations thereof, may be implemented in a single sensor module.

Figure 2:
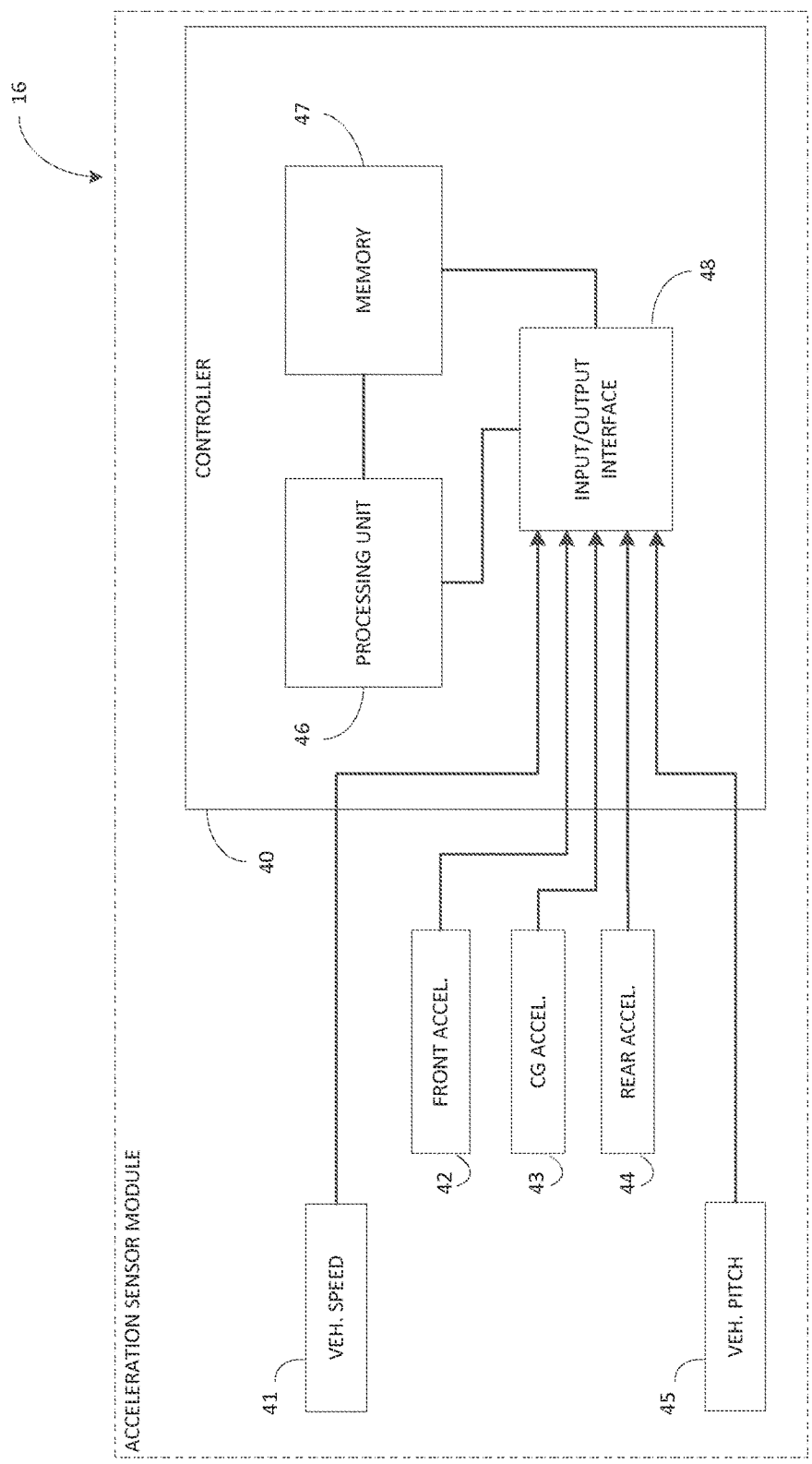
FIG. 2 is a block diagram of a sensor module included in the system of FIG. 1 in accordance with some embodiments.

As illustrated schematically in FIG. 2, the acceleration sensor module 16 includes a controller 40, a vehicle speed sensor 41, a front acceleration sensor 42, a center of gravity (CG) acceleration sensor 43, a rear acceleration sensor 44, and a vehicle pitch sensor 45. In some embodiments, the components of the acceleration sensor module 16 are electrically connected to each other as illustrated in FIG. 2. The connections could be a data bus, or a wired, wireless, or optical connection that enables the components of the displacement sensor module 12 to communicate using network communications protocols, for example, the CAN protocol. The vehicle speed sensor 41 senses the vehicle's speed. In alternative embodiments, the vehicle speed is received by the controller 40 from another source within the vehicle. The front acceleration sensor 42, the center of gravity (CG) acceleration sensor 43, and the rear acceleration sensor 44 sense the acceleration of the vehicle at its front, center of gravity, and rear, respectively. The vehicle pitch sensor 45 senses the pitch of the vehicle along its longitudinal axis. In alternative embodiments, each of the sensors 41-45 may be integrated with its own controller. The controller 40 is configurable to receive the data from the sensors 41-45, and determine a vertical inertia value for the vehicle based on the speed, pitch, and acceleration. The controller 40 is further configurable to communicate the vertical inertia value to the sensor arbitration controller 18.

The controller 40 includes a processing unit 46 (e.g., a microprocessor, application specific integrated circuit, etc.), a memory 47, and an input/output interface 48. The memory 47 can be made up of one or more non-transitory computer-readable media, and includes a program storage area and a data storage area. The program storage area and the data storage area can include combinations of different types of memory, such as read-only memory ("ROM"), random access memory ("RAM") (e.g., dynamic RAM ("DRAM"), synchronous DRAM ("SDRAM"), etc.), electrically erasable programmable read-only memory ("EEPROM"), flash memory, a hard disk, an SD card, or other suitable magnetic, optical, physical, or electronic memory devices. The processing unit 46 is connected to the memory 47 and the input/output interface 48. The processing unit 46 sends and receives information (e.g., from the memory 47 and/or the input/output interface 48), and processes the information by executing one or more software instructions or modules, capable of being stored in a RAM of the memory 47 (e.g., during execution), a ROM of the memory 47 (e.g., on a generally permanent basis), or another non-transitory computer readable medium. The software can include firmware, one or more applications, program data, filters, rules, one or more program modules, and other executable instructions. The processing unit 46 is configured to retrieve from the memory 47 and execute, among other things, software related to processing signals received from the sensors 41-45. The input/output interface 48 transmits and receives information from devices external to the controller 40 (e.g., over one or more wired and/or wireless connections), for example the sensors 41-45 and the sensor arbitration controller 18. The processing unit 46, the memory 47, and the input/output interface 48, as well as the other various modules are connected by one or more control or data buses. The use of control and data buses for the interconnection between and communication among the various modules and components would be known to a person skilled in the art in view of the invention described herein.

The displacement sensor module 12 of FIG. 1 also includes a controller and sensors. The displacement sensor module 12 is configured similarly to the acceleration sensor module 16, except that it includes ride height sensors in lieu of speed, pitch, and acceleration sensors. The ride height sensors are mounted near the four corners of the vehicle's suspension, and are configurable to sense the vertical displacement of the vehicle suspension (i.e., the distance the suspension is above or below its ordinary operating position) at each of the four corners. Ride height sensors are known, and will not be described in greater detail. The displacement sensor module 12 is further configured to communicate the displacement values for each of the four corners of the vehicle to the sensor arbitration controller 18.

The force sensor module 14 also includes a controller and sensors and is configured similarly to the acceleration sensor module 16, except that it includes force (i.e., load) sensors in lieu of speed, pitch, and acceleration sensors. The force sensors are mounted near the four corners of the vehicle's suspension, and are configurable to sense the load on the vehicle suspension at each of the four corners. The controller of the force sensor module 14 is configurable to receive the data from the force sensors, and determine a value for the normal force for the vehicle. The normal force on the vehicle when it is static is equivalent to the weight of the vehicle. As the vehicle moves over the road surface, vertical movement (e.g., bouncing up and down as the vehicle passes over bumps or depressions) will cause variations in the normal force value. Accordingly, variations in the normal force value can be used to determine if the vehicle is heaving (i.e., bouncing). The force sensor module 14 is further configured to communicate the normal force value for the vehicle to the sensor arbitration controller 18.

It should be understood that although only a single processing unit, input/output interface, and memory are illustrated in FIG. 2, the controller 40 can include multiple processing units, memory modules, and/or input/output interfaces. It should also be noted that the other controllers described herein as part of the system 10 (i.e., the sensor arbitration controller 18, the flying car detection controller 20, the TCS controller 22, the ABS controller 24, the VDC controller 26, and the driveline controller 28) are each configured similarly to controller 40, and each include, among other things, a processing unit, a memory, and an input/output interface. In some embodiments, the controllers are implemented partially or entirely on a semiconductor (e.g., a field-programmable gate array ["FPGA"] semiconductor) chip. Similarly, the various modules and controllers described herein may be implemented as individual controllers, as illustrated in FIGS. 1 and 2, or as components of a single controller. In some embodiments, a combination of approaches may be used.

Returning now to FIG. 1, the sensor arbitration controller 18 is configurable to receive data from the displacement sensor module 12, the force sensor module 14, the acceleration sensor module 16, the HMI 30, and other vehicle systems 32. The displacement sensor module 12 provides values for left front displacement, right front displacement, left rear displacement, and right rear displacement for the vehicle. The force sensor module 14 provides a value for the normal force on the vehicle. The acceleration sensor module 16 provides a value for the inertia for the vehicle. The HMI 30 and/or the other vehicle systems 32 provide the vehicle speed, and an indication of any selectable driving modes that may be active (e.g., sport mode, front wheel drive, all-wheel drive, rear wheel drive). The arbitration controller 18 is configured to determine, from the data it receives, the pitch, roll, and heave (i.e., the bounce or vertical displacement) of the vehicle. The sensor arbitration controller 18 is also configured to determine values for front axle displacement, front axle roll, rear axle displacement, and rear axle roll. The sensor arbitration controller 18 is configurable to provide these determined values to the flying car detection controller 20.

The flying car detection controller 20 is configured to determine if the vehicle, or portions thereof, is in the flying car state. The flying car state exists when the vehicle, or a portion of the vehicle, experiences an upward movement that causes it to experience reduced downward forces and enter an unloaded state. The flying car state can exist in one or more wheels of the vehicle. For example, when the entire vehicle moves upward, all four wheels of the vehicle will become unloaded and experience the flying car state. In another example, where only the front or rear of the vehicle moves upward, both wheels on the front or rear axle will become unloaded and experience the flying car state. In other examples, a single wheel or a combination of wheels may experience the flying car state, depending on driving conditions and which portions of the vehicle move upward, thus experiencing reduced downward forces.

The flying car detection controller 20 determines the flying car state based on the values received from the sensor arbitration controller 18, the TCS controller 22, the ABS controller 24, the VDC controller 26, the driveline controller 28, the HMI 30, and other vehicle systems 32. As noted above, the sensor arbitration controller 18 provides the flying car detection controller 20 with values for the vehicle pitch, the vehicle roll, the vehicle heave, front axle displacement, front axle roll, rear axle displacement, and rear axle. The TCS controller 22, the ABS controller 24, and the VDC controller 26 provide the flying car detection controller 20 with information including, for example, whether those systems are active, or in reduced functionality mode, such as a sport mode where certain systems' functions are suppressed to give a different feel to the driver. The other vehicle systems 32 provide the flying car detection controller 20 with information including, for example, whether the brake pedal is depressed, the position of the throttle, the steering angle, and estimates of driving surface conditions (e.g., the coefficient of friction). As noted above, the force changes on the vehicle while it is in the flying car state can affect vehicle dynamics, and the standard algorithms for the vehicle control systems may suffer reduced performance as a result. Accordingly, the flying car detection controller 20 is further configured to communicate a flying car indication, based on the flying car determination, to the TCS controller 22, the ABS controller 24, the VDC controller 26, the driveline controller 28, the HMI 30, and other vehicle systems 32. This indication may be implemented in software as, for example, a flag, or in hardware, as, for example, a voltage level.

The HMI 30 provides an interface between the system 10 and the driver. The HMI 30 is configured to receive input from the driver, receive indications of vehicle status from the system's controllers, and provide information to the driver, the sensor arbitration controller 18, the flying car detection controller 20, or combinations thereof, based on the received indications. The HMI 30 provides a suitable input method such as a button, a touch-screen display having menu options, voice recognition, etc. for manually selecting vehicle driving modes such as winter mode, wet mode, sport mode, and the like. In some embodiments, the HMI 30 may also be configurable to provide an audio, visual, or haptic feedback, or some combination thereof.

The TCS controller 22, the ABS controller 24, the VDC controller 26, and the driveline controller 28 are configurable to receive, from the flying car detection controller 20, an indication that the vehicle is in flying car mode. The TCS controller 22, the ABS controller 24, the VDC controller 26, the driveline controller 28 are configurable to activate countermeasures, appropriate to their respective vehicle systems, based on the flying car indication. The TCS controller 22, the ABS controller 24, the VDC controller 26, the driveline controller 28 are also configurable to communicate data on the operations of their respective systems with each other, the flying car detection controller 20, and other vehicle systems 32.

Countermeasures vary for the TCS controller 22, the ABS controller 24, the VDC controller 26, and the driveline controller 28. Countermeasures may include adjusting the control sensitivity of the vehicle control system, including, for example, the steering may become less sensitive. Countermeasures may also include adjusting the magnitude of an intervention of the vehicle control system, including, for example, increasing or decreasing braking forces applied during automatic braking. Countermeasures may also include adjusting the entry and exit points of the vehicle control system's automatic interventions (i.e., when the control system will begin activating its interventions, and when it will stop intervening). What countermeasures are activated, and what form they take, varies based on the vehicle control system.

The TCS controller 22, which controls the traction control system for the vehicle, engages when the vehicle's wheels are spinning too fast relative to the vehicle. Under typical conditions, the TCS controller 22 will either reduce engine power, or apply the brakes to counteract the spinning wheels and regain traction. Reducing the engine power reduces the drive axle torque, which results in the wheels slowing and regaining traction. However, the reduction of engine power assumes typical normal force values for the drive wheels. If the drive wheels are in an unloaded state because, for example, the vehicle has just gone over a bump, then the wheels will spin up and the TCS controller 22 will reduce engine power in response. However, when the typical normal force values return, for example, by "landing" after the bump, then the engine will not have enough power to keep moving at desired speeds. This is known as a "torque hole." In some embodiments, to prevent a torque hole from developing, the TCS controller 22 will implement a countermeasure when the flying car state is indicated. The countermeasure may include, for example, limiting how much the engine power is reduced, or limiting the duration of the reduction. This countermeasure will allow the TCS controller 22 to reduce excess wheel spin in the unloaded state, while maintaining sufficient power when typical normal force values return.

The TCS controller 22 can also apply the brakes to simulate a limited-slip differential on the drive wheels. This may be done in a "split-mu" situation, where, for example, one of the wheels is on dry pavement, and the other is on snow (or some other low-friction surface). This is referred to as split-mu because the mu (i.e., coefficient of friction) for one wheel varies significantly from the other. In a split-mu situation, the TCS controller 22 senses that only one wheel is spinning excessively. In response, the TCS controller 22 can apply the brake to the wheel in the snow, which forces torque to the wheel on the dry pavement, allowing the vehicle to move forward. Side-to-side normal force variation, where, for example, the left wheel of the drive axle is experiencing a typical normal force value, but the right wheel is in an unloaded condition, is similar to a split-mu situation, but may not be detected by the TCS controller 22 because the unloaded wheel may not be spinning excessively (due to the other wheel experiencing typical normal force value). When a side-to-side normal force variation results in the flying car state indication, the TCS controller 22 may implement a countermeasure, such as activating the simulated limited-slip differential to force more torque to the wheel still experiencing typical normal force values.

The ABS controller 24, which controls the vehicle's anti-lock braking system, operates the brakes to prevent lockup and improve the braking capability of the vehicle. The ABS controller 24 assumes typical normal force values for the wheels when it determines how and when to apply braking forces to prevent brake lockup. However, if the wheels are experiencing less-than-typical normal force values, the brakes will not operate as they would f typical normal force values. For example, if normal force values are typical, the locking pressure at the master cylinder is approximately 80-100 bar. However, when the wheels are unloaded, as in the flying car state, the locking pressure may drop closer to approximately 10-20 bar. If the vehicle is in a flying car state, and the brakes are applied, wheel slip increases. In response, the ABS controller 24, without understanding the flying car state, will perform a pressure release or pressure hold to stabilize the wheel slip. Once the wheels are stable, the ABS controller 24 performs a pressure increase. The amount of deceleration depends on how fast the pressure increase is applied (i.e., the pressure gradient). Because of the different locking pressure caused by the flying car state, there will be insufficient braking force to decelerate the vehicle, and the driver will experience a "hard pedal." This may prevent the driver from making a turn or other maneuver. Accordingly, the ABS controller 24 will activate countermeasures when it receives an indication of a flying car state. The countermeasure may include, for example, a new pressure gradient, which adds pressure back into the wheels as quickly as possible after wheel stability is regained.

The VDC controller 26 operates the vehicle dynamic control system, also known as the vehicle stability control (VSC) system. The VDC controller 26 uses the braking system to individually apply braking forces to the wheels to prevent loss of control of the vehicle, which can occur when the movement of the vehicle, or the driver inputs, exceed what the driving surface can handle. The load or lack of load on a wheel affects how the applied braking forces affect the wheels. Accordingly, the VDC controller 26 may implement countermeasures to take loading into account when a flying car state is indicated. For example, under typical conditions, the VDC controller 26 will apply a yaw correction when the vehicle's yaw rate exceeds a threshold yaw rate. During a flying car state, the threshold yaw rate may be adjusted based on the unloaded state of one or more of the wheels. The adjusted threshold yaw rate may differ, depending on the magnitude of the unloading, which wheels are unloaded, and whether the yaw rate adjustment is triggered to correct and over steer or an under steer. For example, the threshold yaw rate may be increased to avoid correcting in an unloaded state, because, although the vehicle appears to be slipping, it will stop when proper grip returns after the unloaded state. In alternative embodiments, the countermeasures may include increasing or decreasing the magnitude of the braking forces applied. For example, a single wheel may experience a slight unloading, while the others are experiencing typical normal force values. In that case, the threshold yaw rate could remain unadjusted, and the one wheel can be compensated for by increasing the braking forces applied to it. In some embodiments, both the threshold yaw rate and the magnitude of the braking forces are adjusted.

The driveline controller 28 controls the distribution of torque between the front and rear of the vehicle, and the right of left of the vehicle, depending on whether the vehicle is front wheel drive, rear wheel drive, or all-wheel drive. Countermeasures for the driveline controller 28 are similar to the TCS controller 22. However, instead of using the brakes to shunt torque from side to side, or front to rear, the driveline controller 28 uses the driveline to shunt the torque directly. For typical normal force values, the driveline controller 28 distributes torque to the wheels depending on a number of factors, including, for example, wheel slip, mu, vehicle pitch, and vehicle roll. When the flying car state is indicated, the driveline controller 28, as a countermeasure, will also redistribute torque based on which wheels are loaded or unloaded.

Figure 3:
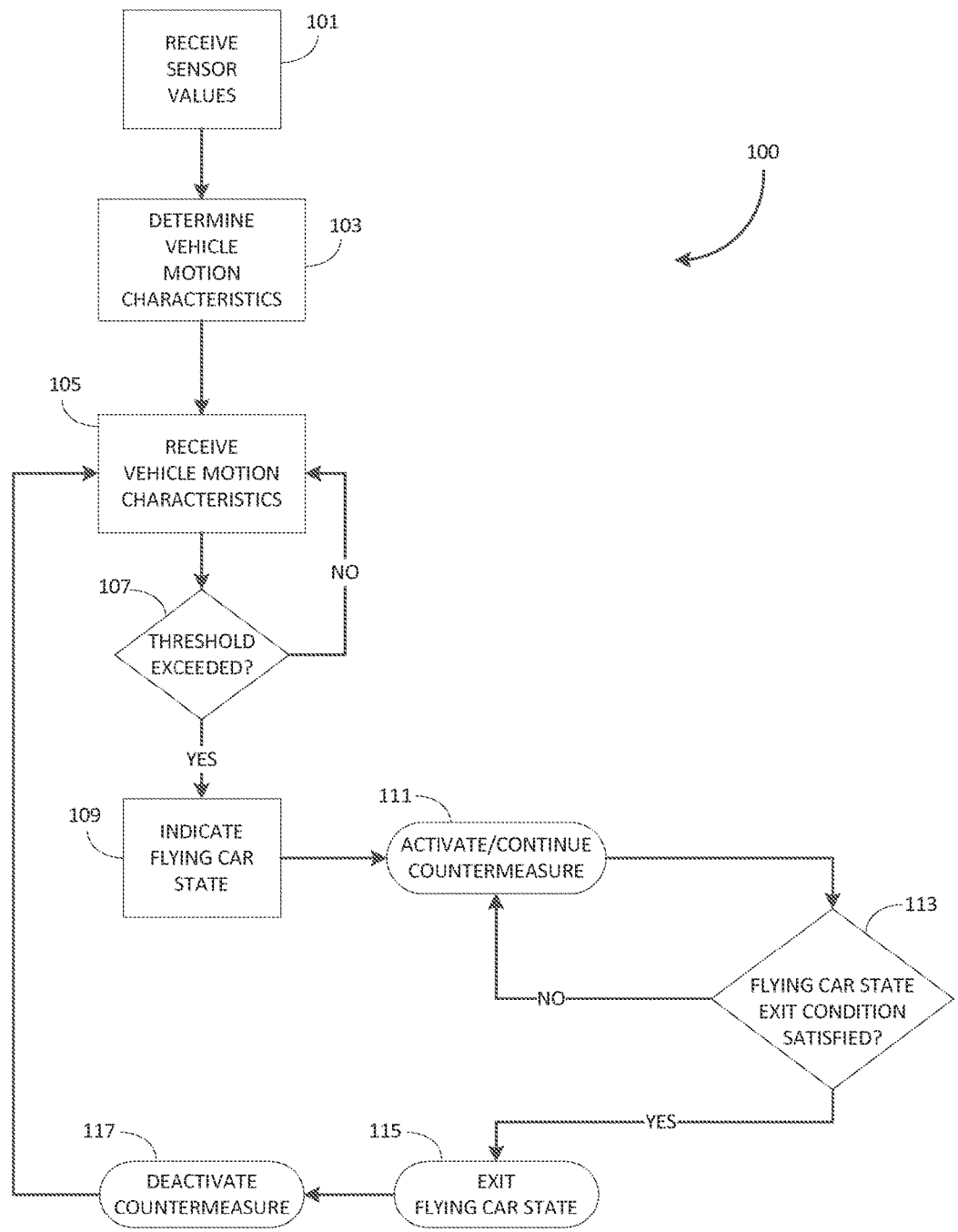
FIG. 3 is a flow chart of a method performed by the system of FIG. 1 to detect an unloaded condition and activate countermeasures in accordance with some embodiments.

The instructions stored in the memories in the controllers illustrated in FIGS. 1 and 2 provide particular functionality when executed by the processors in the controllers. In general the instructions interpret sensor signals to determine vehicle motion characteristics, and compare those characteristics to thresholds to determine a flying car condition. FIG. 3 illustrates a method performed by the controllers of the system 10 to detect a flying car condition, and activate countermeasures as a result.

As illustrated in FIG. 3, the sensor arbitration controller 18 continuously receives sensor signals from the displacement sensor module 12, force sensor module 14, and acceleration sensor module 16 (at block 101). The sensor signals received include, for example, the left front displacement, the right front displacement, the left rear displacement, the right rear displacement, the normal force for the vehicle, and the inertia for the vehicle.

From these sensor signals, the sensor arbitration controller 18 determines the vehicle motion characteristics (at block 103). The vehicle motion characteristics include, for example, the vehicle pitch, the vehicle roll, the vehicle heave, and the displacement and roll of the front and rear axles of the vehicle. The sensor arbitration controller 18 continuously determines the vehicle motion characteristics, and continuously provides them to the flying car detection controller 20.

The flying car detection controller 20 receives the vehicle motion characteristics (at block 105) and compares the vehicle motion characteristics to threshold values to determine if a flying car state exists (at block 107). A flying car state is determined individually for each of the vehicle control systems controlled by the TCS controller 22, the ABS controller 24, the VDC controller 26, and the driveline controller 28. For each of the vehicle control systems being considered, a threshold may be established for one or more of the vehicle motion characteristics. The thresholds are set based on the operating parameters of the specific vehicle control system. For example, the ABS control algorithm may assume typical normal force loading on the wheels when it determines how and when to apply braking forces to prevent brake lockup. At some level below the typical normal force loading on the wheels, the ABS will not operate ideally. That point can be used to establish the thresholds for the vehicle motion characteristics for the ABS system's flying car indication. In another example, the TCS control algorithm assumes a normal loading on the wheels when it controls the engine and braking systems to prevent the wheels from spinning too fast relative to the vehicle. This may normally occur if the wheels are on a loose or wet surface (e.g., gravel, snow, and the like). However, the wheels may also spin up if one or more of them is unloaded. The loading point where the TCS system will cease to operate normally is used to establish the thresholds for the vehicle motion characteristics for the TCS system's flying car indication. The threshold values for the vehicle motion characteristics for each system can be determined through testing.

In some embodiments, rather than using an absolute value for a vehicle motion characteristic, a derivative is taken, and the threshold is set as a rate of change. This takes into account variances in the characteristics caused by drivers, passengers, and cargo. For example, the displacement values for a car occupied solely by the driver will differ from the displacement values for a car occupied by a driver and several passengers. In some embodiments, if a vehicle control system is not active, then no determination will be made with regard to the flying car state for that system. In other embodiments, the vehicle's operating mode will determine whether or how a flying car state determination is made. For example, if a vehicle is operating in an off road mode, thresholds may be altered based on changes in the vehicle control system operating parameters particular to the off road mode. In other embodiments, the vehicle's operating mode may dictate that no determination will be made.

If the vehicle motion characteristics for a vehicle control system exceed the thresholds, then the flying car detection controller 20 indicates that a flying car state exists, and transmits that indication to the appropriate controller (e.g., the TCS controller 22, the ABS controller 24, the VDC controller 26, and the driveline controller 28) (at block 109). If the thresholds are not exceeded, then the flying car detection controller 20 will not indicate a flying car state for that vehicle control system. The flying car detection controller 20 will continue receiving vehicle motion characteristics (at block 105).

If a flying car state exit condition for a control system has not been satisfied, then the controllers (i.e., one or more of the TCS controller 22, the ABS controller 24, the VDC controller 26, and the driveline controller 28) receiving the flying car state indication from the flying car controller 20 will activate one or more countermeasures (at block 111). As described in more detail above, countermeasures vary depending on the vehicle control system, but generally involve altering the behavior of the vehicle control system to mitigate the effects of the unloaded condition that triggered the flying car state indication.

Once a flying car state has been indicated for one of more vehicle control systems, the flying car state indication continues until the flying car controller 20 determines that a flying car state exit condition has been satisfied (at block 113). The flying car controller 20 continuously checks to see if a flying car state exit condition has been satisfied (at block 113).

In some embodiments, an exit condition includes, for example, a determination that the threshold that triggered the flying car state is no longer exceeded. For example, when a vehicle in an unloaded state resumes normal travel on road surface, typical normal force values will return to the suspension. When typical normal force values return, the vehicle movement characteristic values, which triggered the flying car state, will fall below their threshold values. When the flying car controller 20 determines that the values are below the threshold, it will cease indicating a flying car state to respective controller. In alternative embodiments, the exit condition includes, for example, a determination that the drive wheels are operating within normal parameters (e.g., there is no excessive wheel slip).

In some embodiments, an exit condition includes, for example, the detection of an unstable condition. For example, it is possible for an unstable condition in the vehicle's operation to develop after the flying car state was indicated, which condition necessitates preventing or deactivating a countermeasure regardless of whether the threshold is exceeded. As described above, the TCS controller 22 may, in some instances, activate a countermeasure to prevent a torque hole in order to maintain power and speed. However, if the vehicle's wheels are spinning too fast and the vehicle is starting to skid sideways, the VDC controller 26 will indicate this instability to the flying car controller 20. In that case, lowering the torque to increase the lateral capability of the wheels in order to regain vehicle stability is more important than any performance gains realized by not lowering the torque. Thus, the flying car controller 20 will exit the flying car condition for the TCS, regardless of whether the threshold is exceeded. In response to this, the TCS controller 22 will deactivate the countermeasure that prevents the torque hole, and operate as normal to stabilize the vehicle.

In some embodiments, an exit condition includes, for example, the expiration of a timer. In some cases, it is desirable to continue countermeasures after the threshold that triggered the flying car state is no longer exceeded. In such cases, the flying car indication will begin when a threshold is exceeded, and continue until a time expires. For example, a vehicle that crests a hill may become unloaded on all four tires. This will cause the displacement values for both axles to exceed their threshold values. When the vehicle comes down, it may bounce, or heave, one or more times until it settles into a normal driving movement. If exiting the flying car state was based solely on the threshold values, this bouncing of the vehicle might cause it to rapidly enter and exit the flying car state, which in turn would cause the countermeasures to rapidly activate and deactivate. In order to provide a more consistent feel to the driver, the flying car state is maintained for a period of time, which in turn maintains any activated countermeasures for the same period of time. The timer exit condition might be used for systems, for example, where the countermeasures include adjusting the control sensitivity of steering (e.g., the VDC system).

If a flying car state exit condition for a vehicle control system has been satisfied, then the flying car controller 20 will exit the flying car state for the vehicle control system, and cease transmitting the flying car state indication to the respective controller (at block 115). The respective controller will then deactivate its active countermeasures (at block 117). As with the determination to enter the flying car state, the determination whether to exit the flying car state is performed for each of the vehicle control systems controlled by the TCS controller 22, the ABS controller 24, the VDC controller 26, and the driveline controller 28. After a control system exits the flying car state and deactivates its countermeasures, the flying car detection controller 20 will continue to receive and evaluate vehicle motion characteristics for that vehicle control system (at block 105).

Thus, the invention provides, among other things, systems and methods for detecting an unloaded condition in a vehicle, determining the nature and degree of the unloaded condition, and activating countermeasures to improve performance in various vehicle control systems based on the unloaded state. Various features and advantages of the invention are set forth in the following claims.

What is claimed is:

1. A system for detecting and correcting for an unloaded vehicle condition, the system comprising:
   a vehicle control system; and
   a controller configured to
      receive, from a sensor module, at least one sensor value;
      determine at least one vehicle motion characteristic based on the at least one sensor value;
      determine that an unloaded state exists in one or more wheels of the vehicle when a value of the at least one vehicle motion characteristic exceeds a threshold;
      activate at least one countermeasure when the controller determines that the unloaded state exists; and
      deactivate the countermeasure when a timer expires or when an unstable condition is detected.

2. The system of claim 1, wherein the controller is further configured to deactivate the countermeasure, if the timer is not set, when the value of the at least one vehicle motion characteristic returns to a value that is at or below the threshold.

3. The system of claim 1, wherein the threshold is determined based on at least one system variable.

4. The system of claim 3, wherein the at least one system variable includes at least one selected from a group consisting of a vehicle mode status, a steering angle, a throttle position, a brake pedal indicator, a vehicle speed, and a coefficient of friction.

5. The system of claim 1, wherein the at least one sensor value includes at least one selected from a group consisting of a left front displacement, a right front displacement, a left rear displacement, and a right rear displacement.

6. The system of claim 1, wherein the at least one sensor value includes at least one selected from a group consisting of a normal force on the vehicle and an inertia for the vehicle.

7. The system of claim 1, wherein the at least one vehicle motion characteristic includes at least one selected from a group consisting of vehicle pitch, vehicle roll, vehicle heave, front axle displacement, front axle roll, rear axle displacement, and rear axle roll.

8. The system of claim 1, wherein the at least one countermeasure includes at least one selected from a group consisting of adjusting a control sensitivity of the vehicle control system, adjusting the magnitude of an intervention of the vehicle control system, adjusting the entry point of the vehicle control system, and adjusting the exit point of the vehicle control system.

9. A method for detecting and correcting for an unloaded vehicle condition, the method comprising:
   receiving, by a controller, at least one sensor value;
   determining, by the controller, at least one vehicle motion characteristic based on the at least one sensor value;
   determining, by the controller, that an unloaded state exists in one or more wheels of the vehicle when a value of the at least one vehicle motion characteristic exceeds a threshold;
   activating, by the controller, at least one countermeasure when the controller determines that the unloaded state exists; and
   deactivating, by the controller, the countermeasure when a timer expires or when an unstable condition is detected.

10. The method of claim 9, further comprising deactivating, by the controller, the countermeasure, if the timer is not set, when the value of the at least one vehicle motion characteristic returns to a value that is at or below the threshold.

11. The method of claim 9, wherein the threshold is determined based on at least one system variable.

12. The method of claim 11, wherein the at least one system variable includes at least one selected from a group consisting of a vehicle mode status, a steering angle, a throttle position, a brake pedal indicator, a vehicle speed, and a coefficient of friction.

13. The method of claim 9, wherein the at least one sensor value includes at least one selected from a group consisting of a left front displacement, a right front displacement, a left rear displacement, and a right rear displacement.

14. The method of claim 9, wherein the at least one sensor value includes at least one selected from a group consisting of a normal force on the vehicle and an inertia for the vehicle.

15. The method of claim 9, wherein the at least one vehicle motion characteristic includes at least one selected from a group consisting of vehicle pitch, vehicle roll, vehicle heave, front axle displacement, front axle roll, rear axle displacement, and rear axle roll.

16. The method of claim 9, wherein the at least one countermeasure includes at least one selected from a group consisting of adjusting a control sensitivity of the vehicle control system, adjusting the magnitude of an intervention of the vehicle control system, adjusting the entry point of the vehicle control system, and adjusting the exit point of the vehicle control system.

17. The system of claim 1, wherein the unstable condition includes the vehicle skidding sideways.

18. The method of claim 9, wherein the unstable condition includes the vehicle skidding sideways.

\* \* \* \* \*